Aug. 17, 1943.          E. G. HILL                2,326,943
                  CLUTCH CONTROL MECHANISM
              Filed July 8, 1941          2 Sheets-Sheet 2
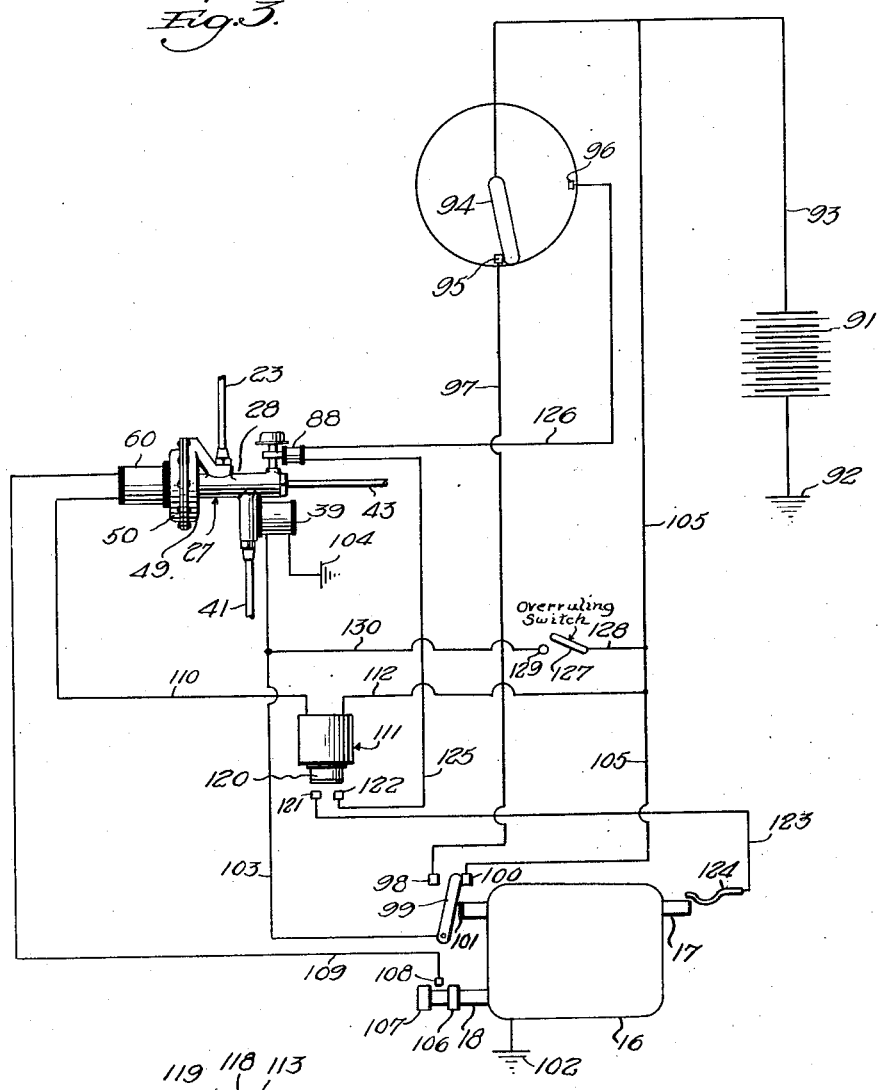
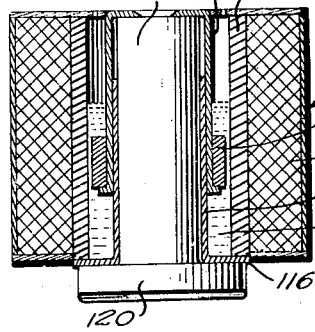
Inventor
EDWARD G. HILL Patented Aug. 17, 1943

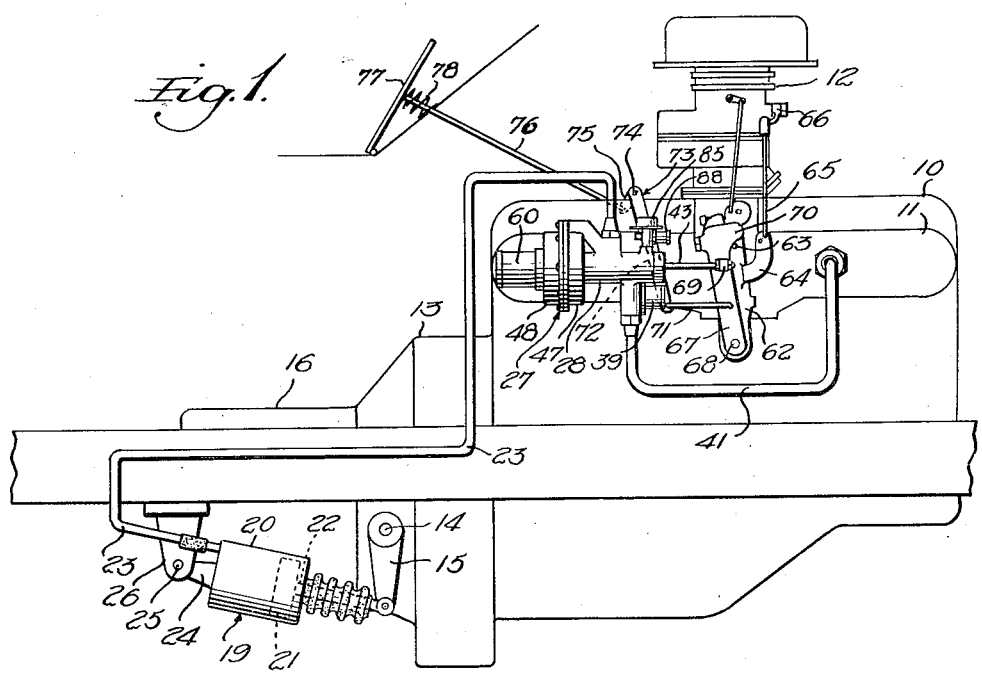

2,326,943

UNITED STATES PATENT OFFICE 2,326,943

CLUTCH CONTROL MECHANISM

Edward G. Hill, Richmond, Va., assignor to Hill Engineering Corporation, Richmond, Va., a corporation of Virginia Application July 8, 1941, Serial No. 401,513

32 Claims. (Cl. 192—.01)

This invention relates to clutch control mechanisms.

The present invention contemplates the use of a fluid pressure operated clutch control motor having a control mechanism of the type shown in my prior Patent No. 1,964,693 wherein a follow-up valve controls the admission of air into the clutch motor to deenergize the latter and thus release the clutch elements for movement toward each other. The follow-up valve of my prior construction is fluid pressure controlled in accordance with pressure differentials in the clutch motor, this type of follow-up valve being found highly advantageous for the reason that it provides for the automatic checking of the movement of the clutch elements into engagement, such movement being retarded if the accelerator is continuously depressed and being arrested if movement of the accelerator pedal is stopped prior to clutch engagement.

The prior construction referred to has been found to provide a highly efficient single control valve mechanism for properly controlling engagement of the clutch elements under most operating conditions and is capable of operation to provide very efficient clutch engagement in the normal shifting operations through which a vehicle transmission passes in starting from a standstill and going successively into first, second and third gears. It is possible to cause clutch engagement to take place too rapidly with the prior construction referred to if the accelerator pedal is depressed too rapidly in first, second or reverse gears, and several effective ways have been proposed in which to take care of clutch engagement under such conditions to prevent too rapid clutch engagement. For example, in the copending application of Edward G. Hill and Henry W. Hey, Serial No. 369,498, filed December 10, 1940, there is disclosed a clutch control mechanism employing a control valve of the type shown in my prior patent referred to, but provided with auxiliary means for varying the loading of the spring associated with the fluid pressure operated follow-up valve to cause a lagging of the clutch elements in first and reverse gears to prevent jerking or lunging of the vehicle when clutch engagement takes place.

In the copending application of Jeannot G. Ingres, Serial No. 379,517, filed February 18, 1941, there is shown a clutch control mechanism wherein a lagging of the clutch elements takes place in first, second and reverse gears to prevent too rapid engagement of the clutch elements upon depression of the accelerator pedal. The prior constructions referred to all provide means connecting the control valve mechanism to the accelerator pedal to move the valve mechanism to a clutch-releasing position when the accelerator pedal is in idling position, the valve mechanism being operable upon depression of the accelerator pedal for effecting clutch engagement. In order to prevent disengagement of the clutch when the vehicle is in high gear and travelling above a predetermined speed, which is desirable to prevent free wheeling under such conditions and to permit the use of the vehicle engine as a brake, the prior constructions preferably have been employed in connection with a system for cutting off the valve mechanism from the source of pressure differential when the transmission is in high gear with the vehicle or the vehicle engine travelling above a predetermined speed. The speed responsive means may be of any desired type such as that shown in the prior patent to Edward G. Hill and Henry W. Hey, No. 2,049,738, or it may be of any other desired type, for example, in the form of a governor operated mechanism driven by the vehicle propeller shaft or any other suitable part of the motor vehicle.

The combination of the various systems referred to provides a highly efficient clutch control mechanism for properly effecting clutch engagement after each gear shifting operation except particularly that condition which exists when a shift down is to be made from high to second gear. Under such conditions the vehicle engine is rotating at a much lower speed in high gear than will be required after the shift down has been made from high to second gear. In the copending application of Edward G. Hill and Henry W. Hey, serial No. 372,410, filed December 30, 1940, there is shown and described a system for causing a substantial lagging of the movement of the clutch elements into operative engagement when a shift is made from high to second gear to permit substantial engine acceleration to take place prior to engagement of the clutch elements.

An important object of the present invention is to provide a clutch control mechanism having a highly improved means for facilitating a shift from high to second gear wherein a substantial time lag occurs before clutch engagement takes place to permit the vehicle engine to properly accelerate.

A further object is to provide such a clutch control mechanism wherein the means referred to functions when the shift down is made from high to second gear but does not normally occur when a shift is being made from first into second gear, thus permitting relatively rapid clutch engagement in second gear under such conditions.

A further object is to provide a device of the character referred to which functions to delay clutch engagement in second gear if the driver, in shifting from first to second gear, substantially delays depressing the accelerator pedal and thus permits engine speed to drop to an idling speed, the time delay under such conditions permitting engine acceleration to take place prior to clutch engagement to prevent jerking of the vehicle or the stalling of the engine.

A further object is to provide an auxiliary control device for a clutch control mechanism in the form of a solenoid switch which functions, when energized, to permit normal clutch engagement to take place and which functions when deenergized to close a circuit causing lagging movement of the clutch elements into engagement to permit time for engine acceleration prior to clutch engagement, the auxiliary control device being constructed to provide a time interval between its initial deenergization and the closing of the circuit which provides the lagging clutch engagement.

Other objects and advantages of the invention will become apparent during the course of the following description.

In the drawings I have shown one embodiment of the invention. In this showing—

Figure 1 is a side elevation of a motor vehicle power plant showing the clutch control mechanism connected thereto, Figure 2 is a central vertical longitudinal sectional view through the control valve mechanism and associated elements, parts being shown in elevation and parts being broken away, Figure 3 is a diagrammatic representation of the electrical control system for the apparatus, and, Figure 4 is a detail sectional view of the auxiliary solenoid switch device.

Referring to Figure 1 the numeral 10 designates a motor vehicle engine having an intake manifold 11 to which explosive mixture is supplied through a conventional carburetor 12. The engine is provided with the usual clutch indicated as a whole by the numeral 13 and having the clutch elements thereof (not shown) controlled by the usual rock shaft 14 to which is connected an operating crank 15. Power is delivered from the clutch through a transmission 16 having the usual shiftable elements for providing conventional gear ratios. Referring to Figure 3 the shiftable elements have been indicated as comprising a second and high gear shift rail 17 and a low and reverse gear shift rail 18. These elements, of course, may be conventional except as slight alteration is required therein for the proper functioning of the present mechanism.

A differential fluid pressure motor 19 is employed for rocking the shaft 14. This motor comprises a cylinder 20 having a piston 21 therein connected by a connecting rod 22 to the lower end of the crank 15. The end of the cylinder 20 toward the crank 15 is open to the atmosphere as will be apparent and the other end of the motor is connected to a vacuum conduit 23. The motor 19 is provided with an arm 24 pivotally connected as at 25 to a supporting bracket 26, the pivotal mounting of the motor permitting the swinging of the motor to accommodate itself to turning movement of the crank 15.

A follow-up control valve mechanism is provided for the motor 19 and is indicated as a whole by the numeral 27 (Figure 2). This valve mechanism comprises a cylindrical body 28 having internal lands 29, 30 and 31 slidably receiving a cylindrical valve 32. This valve is provided with ports 33 communicating between the interior of the valve and the space between the lands 29 and 30. The valve 32 is further provided with ports 34 communicating between the interior of the valve and the space between the lands 30 and 31, this space, in turn, communicating with a port 35 to which the conduit 23 is connected.

The valve 32 is the follow-up valve of the mechanism and slidably receives a main valve 36 having an annular groove 37 throughout the greater portion of its length and constantly communicating with the ports 33 as will become apparent. The groove or space 37, under conditions to be described is adapted to communicate with the ports 34 and thus connect the motor cylinder 20 to the source of pressure differential. To complete such connection, it will be noted that the space between the lands 29 and 30 communicates with a passage 37 controlled by a valve 38 which is the armature of a solenoid 39, and a spring 40 urges the valve 38 to the closed position shown in Figure 2. The outer end of the passage 37 is connected by a pipe 41 to the intake manifold 11, the latter constituting the preferred source of pressure differential.

A cap 42 (Figure 2) is threaded in one end of the valve body 28 and slidably receives a valve operating rod 43. The main valve 36 has an axial opening 44 extending throughout its length and the rod 43 extends into this opening and is pinned to the valve 36 as at 45. Movement of the rod 43 to the left as viewed in Figure 2 connects the groove 37 to the ports 34 thus energizing the motor 19 to disengage the clutch, and means is provided for causing the valve 32 to follow-up with respect to the valve 36. A diaphragm 46 is clamped between the flanges 47 and 48 respectively of a circular enlargement 49 formed integral with the valve body 28 and a cap 50. The enlargement 48 and cap 50 cooperate with the diaphragm 46 to form chambers 51 and 52 the former of which communicates with the space to the left of the land 31, which space communicates with the interior of the valve 32 through ports 53 formed in such valve.

The diaphragm 46 is secured to the adjacent end of the follow-up valve 32 by a screw 54. This screw extends through a spring seat 55 engaged by a compression spring 56 the other end of which engages a spring seat 57. The spring 56 urges the valve 32 toward the right as viewed in Figure 2. The chamber 52 communicates with the port 35 through a passage 59 and accordingly it will be apparent that when the motor cylinder 20 is connected to the source of vacuum, a reduction in pressure in the chamber 52 will occur. This reduction in pressure will correspond to that in the vacuum end of the motor cylinder 20 and atmospheric pressure in the chamber 51 will overcome the tension of the spring 56 to move the follow-up valve 32 to the left a distance corresponding to the extent to which pressure is reduced in the chamber 52.

The spring 56 has a normal tensioning to cause a proper follow-up action of the valve 32 toward the right as viewed in Figure 2 for normal shifts into second and high gear as will become apparent. When a shift is made into low and reverse gear followed by clutch engagement, it is desirable to effect slower clutch engagement and this is accomplished by loading the spring 56 to an increased extent. For this purpose, the cap 50 carries a solenoid 60 the armature 61 of which is connected to the spring seat 57. In a manner to be described, the solenoid 60 is automatically energized when the gear set 16 is in low or reverse gears, thus increasing the loading of the spring 56 to cause the follow-up valve 42 to occupy a position further to the right as viewed in Figure 2 for any given degree of partial vacuum in the chamber 52. This causes a lagging of clutch engagement in a manner to be described.

In accordance with the disclosures of the prior applications referred to, a lever 62 is connected to a shaft 63 of the carburetor throttle (not shown) and this lever has an offset arm 64 connected by a rod 65 to the fuel injector pump 66 which, of course, is conventional in present day carburetors. A second lever 67 is pivoted as at 68 to the lever 62 and a swivel 69 connects this lever to the rod 43. The lever 67 has a projection 70 engageable with the upper end of the arm 64 after predetermined turning movement of the lever 67 about its pivot 68. This movement takes place independently of the lever 62. This independent movement is provided for operating the valve 36 independently of the carburetor throttle and when the projection 70 engages the arm 64, further movement imparted to the lever 67 will move this lever and the lever 62 as a unit to open the engine throttle.

A link 71 is connected to the lever 62 approximately midway between the pivot 68 and swivel 69. The link 71 is connected to the lower end of an arm 72 of a bell crank lever 73, this lever being pivoted on the engine 10 as at 74 and being provided with a second arm 75 connected by a rod 76 to the accelerator pedal 77. A spring 78 urges the accelerator pedal upwardly toward idling position.

The time delay means for retarding clutch engagement to allow time for engine acceleration to take place when a shift is made from high to second gear is preferably electrically controlled in a manner to be described and may be associated with the throttle control lever mechanism shown in Figure 1, for example, by means of a cam engageable with the lever 67 to limit independent turning movement thereof with respect to the lever 62, as shown in the copending application of Edward G. Hill and Henry W. Hey, Serial No. 372,410, referred to above. In the present case the means for causing a substantial lagging movement of the clutch elements into engagement under the conditions referred to has been shown in the form of a device for choking off the admission of air into the motor cylinder 20 when the accelerator is operated to move the valve mechanism in Figure 2 to a clutch releasing position.

Referring to Figure 2 it will be noted that the valve passage 44 is in constant communication with the space 82 within the valve casing 28 adjacent the cap 42. This space communicates through a port 83 with a passage 84 normally open to the atmosphere and preferably provided with a small air cleaner 85. A valve 86 has a reduced stem 87 normally extending across the passage 85 to permit free movement of air therethrough and the valve 86 forms the armature of the solenoid 88 energizable to move the valve to the right as viewed in Figure 2 to the closed position. A spring 89 tends to hold the valve 86 in normal position, and when the valve is in the closed position referred to, a small groove 90 around the head end of the valve provides a restricted communication through the passage 84. Accordingly, when the follow-up valve mechanism is moved to admit air into the motor cylinder 20 to release the clutch, the follow-up valve mechanism completely controls the rate of clutch engagement except when the valve 86 is closed, in which case the rate of clutch engagement is determined by the rate of admission of air around the groove 90 of the valve 86.

In Figure 3 of the drawings there is shown an electrical control system for the apparatus, and this system includes a solenoid controlled switch device for determining the energization of the solenoid 88 just described. Referring to Figure 3, the source of current 91 may be the vehicle battery and one side of the source is grounded as at 92. A wire 93 connects the other terminal of the source to a switch arm 94 engageable with contacts 95 and 96, depending upon vehicle speed. The switch arm 94 is preferably governor controlled in accordance with vehicle speed in any suitable manner and preferably engages the contact 95 at vehicle speeds below 10 miles per hour. This speed is preferred but any predetermined speed may be adapted to engage the switch 94 with the contact 95, and at all higher vehicle speeds the switch arm 94 engages the contact 96.

The contact 95 is connected by a wire 97 to a contact 98 engageable by a switch arm 99 when the shift rail 17 is in the high gear position. For any other position of the high gear shift rail, the switch arm 99 engages a second contact 100. The shift rail 17 is shown as having an insulated end 101 engageable with the switch arm 99 to move it into engagement with the contact 98 without grounding the latter contact on the transmission, the later being shown as being grounded as at 102. The switch arm 99 is connected by a wire 103 to one terminal of the solenoid 39 and the other terminal of this solenoid is grounded as at 104. When the switch arm 99 is in engagement with the contact 100, current flows to the latter contact through a wire 105 connected between the contact 100 and the wire 93.

The low and reverse gear shift rail 18 is provided with a pair of rings 106 and 107 selectively engageable with a contact 108 connected to one end of a wire 109 leading to the solenoid 60. The contacts 106 and 107 are respectively engageable with the contact 108 when the shift rail 18 is in low or reverse gears. Under either of such conditions the solenoid 60 will be energized to increase the loading of the spring 56 (Figure 2) as previously stated. When so energized current flows through the solenoid 60 by means of a wire 110 connected to one terminal of the solenoid indicated as a whole by the numeral 111 and referred to in detail below. From the second terminal of the solenoid 111 a wire 112 leads to the wire 105.

Referring to Figure 4, it will be noted that the solenoid 111 comprises a coil 112 having a core 113 in which is movable an armature, this armature being slightly smaller than the internal diameter of the core 113 for a purpose to be described. A sleeve 115 is spaced from and concentric with the core 113 and is provided at its lower end with a flange 116 connected to the core 113 to form a reservoir 117 adapted to contain oil or the like. The armature 114 is carried by a sleeve 118 surrounding and slidable within the sleeve 115. An enlarged head 120 is carried by the lower end of the internal sleeve 119. The armature 114, sleeves 118 and 119 and head 120 move as a unit as will be apparent.

The armature 114 moves upwardly upon energization of the coil 112 and downwardly when the coil is deenergized, and the speed of downward movement of the armature is dependent upon the area of the space between the armature and the core 113 and the viscosity of the oil 117. These elements are so related to each other that it preferably requires four seconds for the armature 114 to move to its lower limit of movement from the upper limit of movement shown in Figure 4. Upward movement of the armature 114 and the elements connected thereto is limited by engagement of the head 120 with the flange 116.

When the solenoid 111 is deenergized the head 120 moves downwardly in the manner described to engage a pair of contacts 121 and 122 the former of which is connected by a wire 123 to a switch element 124 engageable by the shift rail 17 when the latter is in the second gear position. The contact 122 is connected by a wire 125 to one terminal of the solenoid 88 and the other terminal of this solenoid is connected by a wire 126 to the contact 96.

It will become apparent that when the vehicle is in high gear and travelling above the predetermined speed at which the switch 94 leaves the contact 95, the releasing of the accelerator pedal will not effect clutch disengagement, the clutch remaining engaged to permit the engine to be used as a brake. In order to provide for clutch disengagement under such conditions in order to shift back from high to second gear, it is necessary to provide means for overruling the governor switch 94 and the overruling means may be of any desired form. For example, the overruling means may be in the form of a gear shift lever switch as shown in the copending application of Edward G. Hill and Henry W. Hey, Serial No. 372,410. The particular type of overruling means is not important, and for the purpose of illustration the overruling switch has been shown diagrammatically in Figure 3 and has been indicated by the numeral 127. This switch is connected by a wire 128 to the wire 105 and is engageable with a contact 129 connected by a wire 130 to the wire 103.

The operation of the apparatus is as follows:

The clutch control valve mechanism shown in Figure 2 functions upon operation of the accelerator pedal in the same manner as the prior constructions referred to and need not be described in detail. Generally speaking, it will be obvious that, except under conditions to be described, the releasing of the accelerator pedal effects declutching, and depression of the accelerator pedal releases the clutch elements for movement into operative engagement. Disengagement of the clutch elements, of course, is effected before each gear shift and clutch engagement is effected after each shift has been completed, in accordance with conventional practice.

When the accelerator pedal 77 is released, the bell crank lever 73 will be turned in a clockwise direction to move the levers 62 and 67 until the throttle carried by the shaft 63 reaches idling position whereupon the lever 67 will turn in a counterclockwise direction about its pivot 68, independently of the lever 62. Such movements of the lever mechanism effect movement of the valve operating rod 43 to the left as viewed in Figures 1 and 2 and results in bringing the space 37 (Figure 2) into communication with the ports 34 while closing these ports to the air passage 44. Air will then be exhausted from the vacuum end of the motor cylinder 20 through pipe 23, port 35, ports 34, vacuum space 37, ports 33, passage 37' and pipe 41. This operation, of course, assumes that the valve 38 is opened and this is true except under conditions to be described.

As air is exhausted from the clutch motor it likewise will be similarly exhausted from the diaphragm chamber 52 (Figure 2) through passage 59 and air pressure in the chamber 51 will move the diaphragm 46 to the left. This operation obviously moves the valve 32 to the left to cause it to partake of a follow-up action with respect to the valve 36. Accordingly the extent to which the valve 36 is moved will be accompanied by similar movement of the valve 32, and when movement of the valve 36 stops with the ports 34 communicating with the vacuum space 37, the diaphragm 46 will effect sufficient additional movement of the valve 32 to move the ports 34 out of communication with the vacuum space 37.

When the accelerator pedal 77 is depressed after the desired gear shift has been made, the reverse operation will take place, the lever 67 being turned in a clockwise direction about its pivot 68 (Figure 1) until the projection 70 engages the upper end of the arm 64, whereupon further depression of the accelerator pedal will turn both levers 62 and 67 as a unit about the axis of the throttle shaft 63. These movements of the levers 62 and 67 result in movement of the valve rod 43 to the left as viewed in Figures 1 and 2, whereupon the vacuum space 37 will be definitely moved out of communication with the ports 34 and the latter will be uncovered by the inner end of the valve 36 to communication with the air passage 44. Air will thus flow through pipe 23 into the clutch motor 20 and the clutch springs (not shown) will move the clutch elements toward operative engagement.

Increases in pressure thus taking place in the motor cylinder 20 will be duplicated in the diaphragm chamber 52 (Figure 2) thus tending to balance pressures in the chambers 51 and 52 and rendering the spring 56 effective for moving the valve 32 toward the right as viewed in Figure 2 whereby this valve will follow-up with respect to the valve 36. Upon the slightest initial engagement of the clutch elements a resistance to the movement of the clutch elements and the parts connected thereto will be retarded, and such initial retarding of the movement of the motor piston 21 results in an immediate rise in pressure in the vacuum end of the motor cylinder 20 and in the diaphragm chamber 52, in which case the spring 56 will quickly move the valve 32 slightly further to the right as viewed in Figure 2 to cut off or further restrict communication between the ports 34 and air passage 44. This causes the lessening or complete cutting off of the admission of air into the motor cylinder 20 to slow up the movement of the clutch elements into operative engagement to prevent the grabbing of the clutch elements or the jerking or lunging of the vehicle. This functioning of the apparatus is fully described in the specification in my prior Patent No. 1,964,693, referred to above.

The foregoing operations take place wholly under the control of the operator as determined by movement of the accelerator pedal 77 except when the vehicle is in high gear and travelling above a predetermined speed. Referring to Figure 3 it will be noted that when the transmission is in any gear position except high gear, the switch arm 99 will be in engagement with the contact 100. Accordingly, if the gear set is in neutral position, or is in first, second or reverse gears, a circuit will remain closed from the source 91 through wires 93 and 105, contact 100, switch arm 99, wire 103, solenoid 39 and ground 104, and thence back to the source through ground 92. Under the conditions referred to the energization of the solenoid 39 will hold the valve 38 (Figure 2) in open position so that the controlling of the clutch is solely dependent upon operation of the follow-up valve mechanism in Figure 2 through operation of the accelerator pedal 77.

When the vehicle is in high gear and travelling above a predetermined speed the solenoid 39 will not be energized. The shift into high gear will move the switch arm 99 out of engagement with the contact 100 and into engagement with the contact 98 in which case the previously described circuit through the wire 105 will be broken. If the vehicle is travelling below the predetermined speed referred to, for example, 10 miles per hour, the switch arm 94 (Figure 3) will be in engagement with the contact 95 in which case current will flow through wire 93 and switch arm 94, contact 95, wire 97 and contact 98 to the switch arm 99, and thence will be completed through the path previously described to energize the solenoid 39 and open the valve 38. Above the predetermined speed referred to this circuit will be broken at the contact 95, the switch arm 94 under such conditions engaging the contact 96. Thus the solenoid 39 will be deenergized and the valve 38 (Figure 2) will be closed so that operation of the accelerator pedal to operate the follow-up control valve mechanism will have no effect on the clutch.

Under the conditions just referred to the operator can release the accelerator pedal when in high gear and above the predetermined speed referred to and the clutch elements will be retained in engagement to permit the engine to be used as a brake. Assuming that the vehicle is to be brought to a stop, the operator will release the accelerator pedal and apply the vehicle brakes, and when deceleration has taken place to the point at which the vehicle speed is reduced to the predetermined speed referred to, the switch arm 94 will engage the contact 95 to close the circuit over the wire 97 through the solenoid 39 to open the valve 38. The releasing of the accelerator pedal having moved the valve 36 to clutch releasing position, the opening of the valve 38 will immediately result in the releasing of the clutch elements to permit the vehicle to be brought to a complete stop.

The operation of the follow-up valve mechanism, generally speaking, is the same for all operating conditions except that somewhat slower clutch engagement is provided in first and reverse gears and very much slower clutch engagement is provided after a shift down has been made from high to second gear. Referring to Figure 3 it will be noted that when the vehicle is in either low or reverse gear the contact 108 will be engaged by one of the rings 106 or 107. Under such conditions a circuit will be completed from the source 91 through wires 93, 105 and 112, through the coil of the solenoid switch 111, thence through wire 110, solenoid 60, wire 109, contact 108, ring 106 or 107, and back to the battery through grounds 102 and 92.

The solenoids 60 and 111 are in series and the functioning of the solenoid 111 will be described later. It will be apparent that when the gear set is in either first or reverse gears the solenoid 60 will be energized and this action results in movement of the armature 61 (Figure 2) toward the right to compress the spring 56 and increase the loading thereof. Thus it will be apparent that for any given differential pressure existing between the diaphragm chambers 51 and 52 the valve 32 will be further to the right as viewed in Figure 2 than will be true for the same differential pressure when the solenoid 60 is deenergized and the spring 56 is under its normal tension.

In the clutch engaging operation previously described the valve 36 moves toward the right as viewed in Figure 2 and the valve 32 moves in the same direction during the follow-up action which occurs incident to the admission of air from the passage 44 through the ports 34 into the clutch motor and into the diaphragm chamber 52. The increased loading of the spring 56 causes the valve 32 to follow-up to a slightly greater extent than when the solenoid 60 is deenergized, thus tending to cut off admission of air through the ports 34 slightly earlier than would occur under the normal tensioning of the spring 56. This fact results in the retarding of the admission of air into the clutch motor with a resultant lagging of the clutch elements with respect to the engagement of such elements when the vehicle is in a gear ratio other than first and reverse gears with the solenoid 60 deenergized. This lagging of the movement of the clutch elements provides the highly desirable slightly slower engagement of the clutch elements when the vehicle is being started from a standstill in either low or reverse gears, thus preventing stalling of the motor or jerky clutch engagement.

The most important feature of the present invention is the provision of means for greatly retarding engagement of the clutch elements when a shift is made from high to second gear so as to permit the operator to depress the accelerator pedal and greatly accelerate the engine speed prior to clutch engagement so as to provide substantial synchronization of the clutch elements before they are brought into engagement. The present construction provides for such result while at the same time permitting normal relatively rapid clutch engagement after a shift has been made into second gear from low gear.

Referring to Figure 3, it will be apparent that when the vehicle is in high gear and travelling above the predetermined speed referred to the solenoid 39 will be deenergized, the two parallel circuits for this solenoid being broken at the contact 100 and at the contact 95. Assuming under such conditions that the operator desires to shift back into second gear, he will close the overruling switch 127 to complete a circuit through the solenoid 39 through wires 93, 105, 128 and 130, and thence through the solenoid 39 and grounds 104 and 92 to the battery 91. The valve 38 (Figure 2) will immediately open and with the accelerator in released position the clutch will be immediately disengaged to permit the shift to be made. In connection with the overruling switch it will be obvious that, as previously stated, this switch may be of any desired type and forms no part per se of the present invention.

The clutch having been released the operator will shift from high into second gear and this operation moves the shift rail 17 to the right from the high gear position to the neutral position shown in Figure 3 and thence into the second gear position. Resulting from such operation the switch 99 will move from the contact 98 into engagement with the contact 100 thus re-establishing a circuit through the solenoid 39 independently of the overruling switch which need no longer function. Moreover, the completion of the shift into second gear will engage the shift rail 17 with the contact 124.

It will be apparent that the solenoid 111 will be energized only when the vehicle is in first and reverse gears, the coil of this solenoid being energized only if the contact 108 is engaged by either of the rings 106 or 107 which is not true when the transmission is in high gear. Accordingly when the shift is made from high to second gear the head 120 (Figures 3 and 4) will be in the lower position in engagement with the contacts 121 and 122.

With the vehicle travelling above 10 miles per hour, under the conditions being considered, the switch arm 94 will be in engagement with the contact 96. With the shift completed into second gear, therefore, a circuit will be completed through wire 93, switch arm 94, contact 96, wire 126, solenoid 88, wire 125, contacts 122 and 121, wire 123, contact 124, and ground 102, and thence to the source through ground 92. The immediate result of the shift into second gear, therefore, will be the energization of the solenoid 88 and as seen in Figure 2 this will result in moving the head end of the valve 96 across the passage 84 to restrict communication therethrough in accordance with the effective area of the groove 90.

So far as the operation is now completed it will be apparent that the clutch elements have been disengaged the shift will be completed into second gear, and the operator is ready to engage the clutch elements and accelerate the engine by depressing the accelerator pedal. This the operator will do in accordance with the previous description and the follow-up valve mechanism will function in exactly the same manner as before except that the following-up of the valve 32 with respect to the valve 36 will be greatly retarded due to the restriction of the flow of the air through the valve groove 90. Whereas under the previously described conditions the admission of air into the clutch motor will be controlled wholly by the follow-up valve mechanism, this will not be true since the follow-up action of the valve 32 is dependent upon the admission of air into the chamber 52 and under the conditions being considered the admission of air is greatly restricted. Thus the ports 34 will be held wide open for communication with the air passage 44 but the admission of air through this passage will be greatly restricted thus providing a very slow movement of the motor piston 21 to the clutch engaging position as compared with the normal functioning of the follow-up valve mechanism.

Therefore it will be apparent that when a shift is made from high to second gear a substantial time interval elapses between depression of the accelerator pedal and operative engagement of the clutch elements and this interval is sufficient to permit substantial engine acceleration to approximately synchronize the speed of the clutch elements before they are brought into clutch engagement to take place under such condition without any jerking or lunging of the vehicle.

The energization of the solenoid 88 is dependent upon deenergization of the coil of the solenoid 111 so that the head 120 will be in engagement with the contacts 121 and 122. The solenoid 111 obviously is deenergized when the vehicle is in high gear, and with the vehicle travelling above a predetermined speed the only thing necessary to energize the solenoid 88 is the movement of the shift rail 17 to the second gear position to contact with the spring contact 124. This is the only movement necessary, therefore, to effect energization of the solenoid 88 to provide the choking action which is employed for providing slow clutch engagement when the shift is made from high to second gear. When the vehicle is in low or reverse gears, the solenoid 111 is energized in the manner previously described and accordingly no circuit can be completed through the solenoid 88.

Referring to Figure 4 it will be seen that when the solenoid coil 112 is energized when the vehicle is in first or reverse gears, the head 120 is in contact with the flange 116, substantially out of engagement with the contacts 121 and 122. Assuming that the vehicle is being started from a standstill in low gear the parts of the solenoid switch will occupy the positions shown in Figure 4 and after the vehicle has gained sufficient speed in low gear the operator will release the accelerator pedal to disengage the clutch, then make the shift into second gear and operate the accelerator pedal to effect clutch engagement. As soon as the shift is made out of low gear the circuit through the solenoid 60 is broken at the contact 108 to restore the normal tension of the spring 56 (Figure 2) and the circuit through the coil of the solenoid 111 also will be broken. However, the head 120 will not immediately drop into engagement with the contacts 121 and 122 owing to the dashpot action of the armature 114 (Figure 4) moving in the oil in the space 117. The armature 114 is of an external diameter slightly smaller than the internal diameter of the core 113 or the periphery of the armature 114 is grooved, thus providing for the restricted passage of oil past the armature 114 as the latter moves downwardly by gravity together with the elements connected thereto when the coil 112 is deenergized.

The time interval required for movement of the head 120 downwardly into engagement with the contacts 121 and 122 may be regulated by properly designing the solenoid switch to determine the rate of flow of oil or other liquid past the armature 114. In actual practice it has been found that a four second interval between deenergization of the coil 112 and engagement of the head 120 with the contacts 121 and 122 is highly desirable. This time interval serves two important functions. In the first place, it permits ample time between the breaking of the circuit through the coil 112 when the shift is made out of low gear and the completion of the shift into second gear and the effecting of clutch engagement before the head 120 engages the contacts 121 and 122. Therefore the energization of the solenoid 88 and the restriction of flow of air through the follow-up valve mechanism is prevented during the normal shift from first to second gears but is provided for when the shift is made from high to second gear, as previously described.

In the second place, for a relatively rapid clutch engagement incident to a relatively rapid depression of the accelerator pedal when the gear set is in second gear it is desirable that the engine be rotating at a reasonable speed, otherwise jerky clutch engagement will result. Sometimes when a vehicle is in heavy traffic or is pulling out from the side of a highway, an operator will put the gear set in low gear, accelerate the engine and effect clutch engagement, and will then find it necessary to delay clutch engagement in second gear because of traffic conditions. Under such conditions the engine will lose speed which has been gained in low gear so that relatively rapid clutch engagement in second gear is impracticable.

With the present device a delay of four seconds in completing the shift into second gear and the completing thereafter of the engagement of the clutch elements will result in the engagement of the head 120 with the contacts 121 and 122, and accordingly the solenoid 88 will be energized to choke the admission of air into the clutch motor. If, under such conditions, the operator then depressed the accelerator pedal too rapidly, the choke valve 86 (Figure 2) will function in the manner previously described to effect relatively slow clutch engagement.

From the foregoing it will be apparent that the present clutch control system provides for efficient clutch engagement under all conditions of motor vehicle operation. Somewhat slower clutch engagement is provided in first and reverse gears by the compression of the spring 56, thus preventing stalling of the engine or jerky clutch engagement when the vehicle is being started from a standstill. When a normal shift is made from first to second gear and the engine accelerator is depressed to permit clutch engagement, the rate of this engagement is permitted to take place normally in accordance with the normal functioning of the follow-up valve mechanism. If the operator delays too long in completing the shift into second gear and depressing the accelerator pedal and the engine loses substantial speed, the choke valve 86 will come into operation and provide the desired relatively slow clutch engagement.

It will be apparent that the solenoid 88 is inoperative when the shift is made into high gear. The circuit for this solenoid is always dependent upon the closing of the circuit across the contact 124 and shift rail 17 and this circuit is broken when the shift is made into high gear and accordingly the rate of clutch engagement is determined solely by operation of the follow-up valve mechanism and clutch engagement may take place quite rapidly under such conditions. The principal function of the solenoid valve 111 is for the shift back from high to second gear in the manner previously described, the choking of the admission of air into the clutch motor preventing the controlling of the rate of clutch engagement by the operation of the follow-up valve mechanism in the normal manner, the rate of clutch engagement being very much retarded in comparison with the normal rate to allow ample time for the synchronization of the clutch elements thus providing for very smooth clutch engagement when shifting from high to second gear.

It is to be understood that the form of the invention herewith shown and described is to be taken as a preferred example of the same and that various changes in the shape, size, and arrangement of parts may be resorted to without departing from the spirit of the invention or the scope of the subjoined claims.

I claim:

1. A clutch control mechanism comprising a power device connected to the clutch, control mechanism for energizing the power device to disengage the clutch and for deenergizing the power device for releasing the clutch elements for controlled movement into engagement with each other, auxiliary control means for causing a relative lagging of the movement of the clutch elements into operative engagement upon operation of said control mechanism to deenergize said power device, and a second auxiliary control means for effecting a lagging of the movement of the clutch elements into operative engagement and operable only during inoperativeness of said first named auxiliary means.

2. A clutch control mechanism comprising a power device connected to the clutch, control mechanism for energizing the power device to disengage the clutch and for deenergizing the power device for releasing the clutch elements for controlled movement into engagement with each other, auxiliary control means for causing a relative lagging of the movement of the clutch elements into operative engagement upon operation of said control mechanism to deenergize said power device, a second auxiliary control means operative for effecting a relative lagging of the movement of the clutch elements into operative engagement, and means for rendering said second auxiliary control means operable only during inoperativeness of the first named auxiliary control means.

3. A clutch control mechanism comprising a power device connected to the clutch, control mechanism for energizing the power device to disengage the clutch and for deenergizing the power device for releasing the clutch elements for controlled movement into engagement with each other, auxiliary control means for causing a relative lagging of the movement of the clutch elements into operative engagement upon operation of said control mechanism to deenergize said power device, a second auxiliary control means operative for effecting a relative lagging of the movement of the clutch elements into operative engagement, a control device for said second auxiliary control means, and means for rendering said control device ineffective for rendering said second auxiliary control means operative until after the first named auxiliary control means has been inoperative for at least a predetermined length of time.

4. A clutch control mechanism comprising a power device connected to the clutch, control mechanism for energizing the power device to disengage the clutch and for deenergizing the power device for releasing the clutch elements for controlled movement into engagement with each other, auxiliary control means for causing a relative lagging of the movement of the clutch elements into operative engagement upon operation of said control mechanism to deenergize said power device, and an electro-magnetic device energizable for effecting a lagging of the movement of the clutch elements into operative engagement and capable of energization only during inoperativeness of said auxiliary control means.

5. A clutch control mechanism comprising a power device connected to the clutch, control mechanism for energizing the power device to disengage the clutch and for deenergizing the power device for releasing the clutch elements for controlled movement into engagement with each other, auxiliary control means for causing a relative lagging of the movement of the clutch elements into operative engagement upon operation of said control mechanism to deenergize said power device, an electro-magnetic device energizable for effecting a relative lagging of the movement of the clutch elements into operative engagement, and a circuit for said electro-magnetic device including a switch arranged to be closed only when said auxiliary control means is inoperative.

6. A clutch control mechanism comprising a power device connected to the clutch, control mechanism for energizing the power device to disengage the clutch and for deenergizing the power device for releasing the clutch elements for controlled movement into engagement with each other, auxiliary control means for causing a relative lagging of the movement of the clutch elements into operative engagement upon operation of said control mechanism to deenergize said power device, an electro-magnetic device energizable for effecting a relative lagging of the movement of the clutch elements into operative engagement, a circuit for said electro-magnetic device including a switch, and a control device operative for opening said switch when said auxiliary control means is operative, said switch being biased for movement to closed position and said control device being constructed and arranged to delay movement of said switch to closed position.

7. A clutch control mechanism comprising a power device connected to the clutch, a control mechanism for energizing the power device to disengage the clutch and for deenergizing the power device for releasing the clutch elements for controlled movement into engagement with each other, a pair of electro-magnetic devices separately energizable to effect a lagging of the movement of the clutch elements into operative engagement, and means for preventing the closing of a circuit through one of said electro-magnetic devices when the other electro-magnetic device is energized.

8. A clutch control mechanism comprising a power device connected to the clutch, a control mechanism for energizing the power device to disengage the clutch and for deenergizing the power device for releasing the clutch elements for controlled movement into engagement with each other, a pair of electro-magnetic devices separately energizable to effect a lagging of the movement of the clutch elements into operative engagement, and means for preventing the closing of a circuit through one of said electro-magnetic devices when the other electro-magnetic device is energized, said means being constructed and arranged to prevent energization of the first mentioned electro-magnetic device until after said other electro-magnetic device has been deenergized for a predetermined length of time.

9. A clutch control mechanism comprising a power device connected to the clutch, a control mechanism for energizing the power device to disengage the clutch and for deenergizing the power device for releasing the clutch elements for controlled movement into engagement with each other, a pair of electro-magnetic devices separately energizable to effect a lagging of the movement of the clutch elements into operative engagement, a switch for the circuit of one of said electro-magnetic devices biased to closed position, and means for holding said switch open when the other electro-magnetic device is energized.

10. A clutch control mechanism comprising a power device connected to the clutch, a control mechanism for energizing the power device to disengage the clutch and for deenergizing the power device for releasing the clutch elements for controlled movement into engagement with each other, a pair of electro-magnetic devices separately energizable to effect a lagging of the movement of the clutch elements into operative engagement, a switch for the circuit of one of said electro-magnetic devices biased to closed position, and means for holding said switch open when the other electromagnetic device is energized, said means comprising a third electro-magnetic device connected to said switch and arranged in series with said other electro-magnetic device whereby energization of the latter prevents the closing of said switch.

11. A clutch control mechanism comprising a power device connected to the clutch, a control mechanism for energizing the power device to disengage the clutch and for deenergizing the power device for releasing the clutch elements for controlled movement into engagement with each other, a pair of electro-magnetic devices separately energizable to effect a lagging of the movement of the clutch elements into operative engagement, a switch for the circuit of one of said electro-magnetic devices biased to closed position, means for holding said switch open when the other electro-magnetic device is energized, said means comprising a third electromagnetic device connected to said switch and arranged in series with said other electro-magnetic device whereby energization of the latter prevents the closing of said switch, and means for delaying the closing of said switch upon deenergization of said third electro-magnetic device.

12. A clutch control mechanism comprising a fluid pressure operated power device connected to the clutch, a control valve mechanism for connecting the power device to a source of pressure differential to disengage the clutch and for establishing pressure equalization in the power device for releasing the clutch elements for controlled movement into engagement with each other, auxiliary control means for changing the functioning of said control valve mechanism to relatively retard the establishment of pressure equalization in said power device to cause a relative lagging of the movement of the clutch elements into operative engagement, and a second auxiliary control means for retarding the establishment of pressure equalization in said power device to effect a lagging of the movement of the clutch elements into operative engagement, said second auxiliary control means being operable only during inoperativeness of said first named auxiliary means.

13. A clutch control mechanism comprising a fluid pressure operated power device connected to the clutch, a control valve mechanism for connecting the power device to a source of pressure differential to disengage the clutch and for establishing pressure equalization in the power device for releasing the clutch elements for controlled movement into engagement with each other, auxiliary control means for changing the functioning of said control valve mechanism to relatively retard the establishment of pressure equalization in said power device to cause a relative lagging of the movement of the clutch elements into operative engagement, and a second auxiliary control means for retarding the establishment of pressure equalization in said power device to effect a lagging of the movement of the clutch elements into operative engagement, and means for rendering said second auxiliary control means operable only during inoperativeness of the first named auxiliary control means.

14. A clutch control mechanism comprising a fluid pressure operated power device connected to the clutch, a control valve mechanism for connecting the power device to a source of pressure differential to disengage the clutch and for establishing pressure equalization in the power device for releasing the clutch elements for controlled movement into engagement with each other, auxiliary control means for changing the functioning of said control valve mechanism to relatively retard the establishment of pressure equalization in said power device to cause a relative lagging of the movement of the clutch elements into operative engagement, and a second auxiliary control means for retarding the establishment of pressure equalization in said power device to effect a lagging of the movement of the clutch elements into operative engagement, a control device for said second auxiliary control means, and means for rendering said control device ineffective for rendering said second auxiliary control means operative until after the first named auxiliary control means has been inoperative for at least a predetermined length of time.

15. A clutch control mechanism comprising a fluid pressure operated power device connected to the clutch, a control valve mechanism for connecting the power device to a source of pressure differential to disengage the clutch and for establishing pressure equalization in the power device for releasing the clutch elements for controlled movement into engagement with each other, auxiliary control means for changing the functioning of said control valve mechanism to relatively retard the establishment of pressure equalization in said power device to cause a relative lagging of the movement of the clutch elements into operative engagement, and an electromagnetic device energizable for effecting a lagging of the movement of the clutch elements into operative engagement and capable of energization only during inoperativeness of said auxiliary control means.

16. A clutch control mechanism comprising a fluid pressure operated power device connected to the clutch, a control valve mechanism for connecting the power device to a source of pressure differential to disengage the clutch and for establishing pressure equalization in the power device for releasing the clutch elements for controlled movement into engagement with each other, auxiliary control means for changing the functioning of said control valve mechanism to relatively retard the establishment of pressure equalization in said power device to cause a relative lagging of the movement of the clutch elements into operative engagement, an electromagnetic device energizable for effecting a relative lagging of the movement of the clutch elements into operative engagement, and a circuit for said electro-magnetic device including a switch arranged to be closed only when said auxiliary control means is inoperative.

17. A clutch control mechanism comprising a fluid pressure operated power device connected to the clutch, a control valve mechanism for connecting the power device to a source of pressure differential to disengage the clutch and for establishing pressure eqalization in the power device for releasing the clutch elements for controlled movement into engagement with each other, auxiliary control means for changing the functioning of said control valve mechanism to relatively retard the establishment of pressure equalization in said power device to cause a relative lagging of the movement of the clutch elements into operative engagement, an electromagnetic device energizable for effecting a relative lagging of the movement of the clutch elements into operative engagement, a circuit for said electro-magnetic device including a switch, and a control device operative for opening said switch when said auxiliary control means is operative, said switch being biased for movement to closed position and said control device being constructed and arranged to delay movement of said switch to closed position.

18. A clutch control mechanism comprising a fluid pressure operated power device, a follow-up control valve mechanism for connecting the power device to a source of pressure differential to disengage the clutch and for establishing pressure equalization in the power device for releasing the clutch elements for controlled movement into engagement with each other, a pair of electro-magnetic devices separately energizable to retard the establishment of pressure equalization in said power device upon a clutch element releasing operation of said valve mechanism to effect a lagging of the movement of the clutch elements into operative engagement, and means for preventing the closing of a circuit through one of said electro-magnetic devices when the other device is energized.

19. A clutch control mechanism comprising a fluid pressure operated power device, a follow-up control valve mechanism for connecting the power device to a source of pressure differential to disengage the clutch and for establishing pressure equalization in the power device for releasing the clutch elements for controlled movement into engagement with each other, a pair of electro-magnetic devices separately energizable to retard the establishment of pressure equalization in said power device upon a clutch element releasing operation of said valve mechanism to effect a lagging of the movement of the clutch elements into operative engagement, and means for preventing the closing of a circuit through one of said electro-magnetic devices when the other device is energized, said means being constructed and arranged to prevent energization of the first named electro-magnetic device until after the other electro-magnetic device has been deenergized for a predetermined length of time.

20. A clutch control mechanism comprising a fluid motor, a control valve mechanism therefor operable for connecting said motor to a source of pressure differential to disengage the clutch and for establishing pressure equalization in said motor to release the clutch elements for movement into operative engagement, means for causing a follow-up action of said valve mechanism comprising a pressure responsive element having a pressure chamber communicating with the motor, and a spring urging said pressure responsive element in one direction against the differential pressure established in said chamber, auxiliary control means for varying the follow-up action of said valve mechanism by changing the loading of said spring to retard the establishment of pressure equalization in said motor upon a clutch element releasing operation of said valve mechanism, a second auxiliary control means for retarding the establishment of pressure equalization in said motor, and means for rendering said second auxiliary control means operable only during inoperativeness of the first named auxiliary control means.

21. A clutch control mechanism comprising a fluid motor, a control valve mechanism therefor operable for connecting said motor to a source of pressure differential to disengage the clutch and for establishing pressure equalization in said motor to release the clutch elements for movement into operative engagement, means for causing a follow-up action of said valve mechanism comprising a pressure responsive element arranged between two chambers one of which is a pressure chamber communicating with the motor, and a spring urging said pressure responsive element in one direction against differential pressures in said chambers, auxiliary control means for varying the follow-up action of said valve mechanism by changing the loading of said spring to retard the establishment of pressure equalization in said motor upon a clutch element releasing operation of said valve mechanism, a second auxiliary control means for retarding the establishment of pressure equalization in said motor, and means for rendering said second auxiliary control means operable only during inoperativeness of the first named auxiliary control means, said last named means being constructed and arranged to render said second auxiliary control means operative only after said first named auxiliary control means has been rendered inoperative for a predetermined length of time.

22. A clutch control mechanism comprising a fluid motor, a control valve mechanism therefor operable for connecting said motor to a source of pressure differential to disengage the clutch and for establishing pressure equalization in said motor to release the clutch elements for movement into operative engagement, means for causing a follow-up action of said valve mechanism comprising a pressure responsive element arranged between two chambers one of which is a pressure chamber communicating with the motor, and a spring urging said pressure responsive element in one direction against differential pressures in said chambers, an electro-magnetic device for changing the loading of said spring to alter the follow-up action of said valve mechanism to retard the establishment of pressure equalization in said motor and effect a lagging of the movement of the clutch elements into operative engagement, a second electro-magnetic device for retarding the establishment of pressure equalization in said motor to effect a lagging of the movement of the clutch elements into operative engagement, and means for maintaining a circuit through the second electro-magnetic device open until a predetermined length of time has elapsed after the deenergization of the first named electro-magnetic device.

23. A clutch control mechanism comprising a fluid motor, a control valve mechanism therefor operable for connecting said motor to a source of pressure differential to disengage the clutch and for establishing pressure equalization in said motor to release the clutch elements for movement into operative engagement, means for causing a follow-up action of said valve mechanism comprising a pressure responsive element arranged between two chambers one of which is a pressure chamber communicating with the motor, and a spring urging said pressure responsive element in one direction against differential pressures in said chambers, a pair of electro-magnetic devices separately energizable to retard the establishment of pressure equalization in said motor to effect a lagging of the movement of the clutch elements into operative engagement, a switch for the circuit of one of said electro-magnetic devices, and means for maintaining said switch open when the other electro-magnetic device is energized, said last named means being constructed and arranged to prevent the closing of said switch for a predetermined length of time after the deenergization of said other electro-magnetic device.

24. A clutch control mechanism for a motor vehicle having a clutch, and a transmission including shiftable means for providing different gear ratios, comprising a power device connected to the clutch, a control mechanism for energizing the power device to disengage the clutch and for deenergizing the power device for releasing the clutch elements for controlled movement into engagement with each other, a pair of auxiliary control means respectively operative when the transmission shiftable means is operative for providing different gear ratios, for causing a relative lagging of the movement of the clutch elements into operative engagement upon operation of said control mechanism to deenergize said power device, and means for rendering one of said auxiliary control means inoperative unless the other auxiliary control means is inoperative.

25. A clutch control mechanism for a motor vehicle having a clutch, and a transmission including shiftable means for providing different gear ratios, comprising a power device connected to the clutch, a control mechanism for energizing the power device to disengage the clutch and for deenergizing the power device for releasing the clutch elements for controlled movement into engagement with each other, a pair of auxiliary control means respectively operative when the transmission shiftable means is operative for providing different gear ratios, for causing a relative lagging of the movement of the clutch elements into operative engagement upon operation of said control mechanism to deenergize said power device, and means for rendering one of said auxiliary control means inoperative unless the other auxiliary control means is inoperative, said last named means being constructed and arranged to render the first mentioned auxiliary control means inoperative unless said other auxiliary control means has been inoperative over a predetermined period of time.

26. A clutch control mechanism for a motor vehicle having a clutch, and a transmission including shiftable means for providing different gear ratios, comprising a power device connected to the clutch, a control mechanism for energizing the power device to disengage the clutch and for deenergizing the power device for releasing the clutch elements for controlled movement into engagement with each other, a pair of electro-magnetic control devices respectively operable when the transmission shiftable means is respectively positioned for providing different gear ratios, for causing a relative lagging of the movement of the clutch elements into operative engagement upon operation of said control mechanism to deenergize said power device, a switch in the circuit of one of said electro-magnetic devices, and means for holding said switch open when the other electro-magnetic device is operative, to prevent operation of said first mentioned electro-magnetic control device.

27. A clutch control mechanism for a motor vehicle having a clutch, and a transmission including shiftable means for providing different gear ratios, comprising a power device connected to the clutch, a control mechanism for energizing the power device to disengage the clutch and for deenergizing the power device for releasing the clutch elements for controlled movement into engagement with each othr, a pair of electromagnetic control devices respectively operable when the transmission shiftable means is respectively positioned for providing different gear ratios, for causing a relative lagging of the movement of the clutch elements into operative engagement upon operation of said control mechanism to deenergize said power device, a switch in the circuit of one of said electro-magnetic devices, and means for holding said switch open when the other electro-magnetic device is operative, to prevent operation of said first mentioned electro-magnetic control device, said last named means being constructed and arranged to prevent said switch from closing until the second mentioned electro-magnetic device has been inoperative for at least a predetermined length of time.

28. A clutch control mechanism for a motor vehicle having an engine, a throttle and an accelerator connected thereto, a clutch, and a transmission having shiftable means movable to provide a transmission condition normally used when the vehicle is started from a standstill and movable to provide a second transmission condition normally used after the vehicle has gained momentum, comprising a power device connected to the clutch, a follow-up control mechanism for the power device having connection with the accelerator and throttle and having operative association with the power device to cause the latter to follow up with respect to the accelerator pedal, a pair of auxiliary control devices one operative under the first named transmission condition and the other operative under the second transmission condition for causing a relative lagging of the movement of the clutch elements into operative engagement upon a clutch element releasing operation of the control mechanism, and means operable when the first named auxiliary control device is operative for rendering the second named auxiliary control device inoperative.

29. A clutch control mechanism for a motor vehicle having an engine, a throttle and an accelerator connected thereto, a clutch, and a transmission having shiftable means movable to provide a transmission condition normally used when the vehicle is started from a standstill and movable to provide a second transmission condition normally used after the vehicle has gained momentum, comprising a power device connected to the clutch, a follow-up control mechanism for the power device having connection with the accelerator and throttle and having operative association with the power device to cause the latter to follow up with respect to the accelerator pedal, a pair of auxiliary control devices one operative under the first named transmission condition and the other operative under the second transmission condition for causing a relative lagging of the movement of the clutch elements into operative engagement upon a clutch element releasing operation of the control mechanism, and means operable when the first named auxiliary control device is operative for rendering the second named auxiliary control device inoperative, said last named means being constructed and arranged to prevent operation of the second named auxiliary control device until after the first named device has been inoperative for a predetermined length of time.

30. A clutch control mechanism for a motor vehicle having an engine, a throttle and an accelerator connected thereto, a clutch, and a transmission having shiftable means movable to provide a transmission condition normally used when the vehicle is started from a standstill and movable to provide a second transmission condition normally used after the vehicle has gained momentum, comprising a power device connected to the clutch, a follow-up control mechanism for the power device having connection with the accelerator and throttle and having operative association with the power device to cause the latter to following up with respect to the accelerator pedal, a pair of electromagnetic control devices one operable under the first named transmission condition and the other operable under the second transmission condition for causing a relative lagging of the movement of the clutch elements into operative engagement upon a clutch element releasing operation of said control mechanism, and means in the circuit of the first mentioned electro-magnetic device for preventing operation of the second mentioned device when the first mentioned device is operative.

31. A clutch control mechanism for a motor vehicle having an engine, a throttle and an accelerator connected thereto, a clutch, and a transmission having shiftable means movable to provide a transmission condition normally used when the vehicle is started from a standstill and movable to provide a second transmission condition normally used after the vehicle has gained momentum, comprising a power device connected to the clutch, a follow-up control mechanism for the power device having connection with the accelerator and throttle and having operative association with the power device to cause the latter to follow up with respect to the accelerator pedal, a pair of electromagnetic control devices one operable under the first named transmission condition and the other operable under the second transmission condition for causing a relative lagging of the movement of the clutch elements into operative engagement upon a clutch element releasing operation of said control mechanism, a switch in the circuit of the second mentioned electro-magnetic device, means for holding said switch open when the first mentioned electromagnetic device is energized, and time delay means for preventing the closing of said switch for a predetermined length of time after deenergization of the first mentioned electro-magnetic device.

32. A clutch control mechanism comprising a power device connected to the clutch, control mechanism for energizing the power device to disengage the clutch and for deenergizing the power device for releasing the clutch elements for controlled movement into engagement with each other, a pair of auxiliary control means separately operable for causing a relative lagging of the movement of the clutch elements into operative engagement upon operation of said control mechanism to deenergize said power device, operating means for rendering one of said control means operative, and operating means for rendering the other control means operative, said last named operating means comprising a time delayed device for rendering the second mentioned control means operative only after a predetermined period of inoperativeness of the first mentioned control means.

EDWARD G. HILL.